JOHN K. CHACE.

Improvement in Fastenings for Paint Cans &c.

No. 4,628. Reissued Nov. 7, 1871.

Witnesses
Chas. H. Smith
Geo. D. Walker

John K. Chace
L. W. Serrell
Atty

UNITED STATES PATENT OFFICE.

JOHN K. CHACE, OF NEW YORK, N. Y., ASSIGNOR TO SILAS A. ILSEY AND CHARLES L. NORTHRUP.

IMPROVEMENT IN FASTENINGS FOR PAINT-CANS, &c.

Specification forming part of Letters Patent No. 101,430, dated April 5, 1870; reissue No. 4,628, dated November 7, 1871.

*To all whom it may concern:*

Be it known that I, JOHN K. CHACE, of the city and State of New York, have invented and made a new and useful Improvement in Covers for Pails, Cans, &c.; and I do hereby declare the following to be a full, clear, and exact description of the said invention, reference being had to the annexed drawing, wherein—

Figure 1:
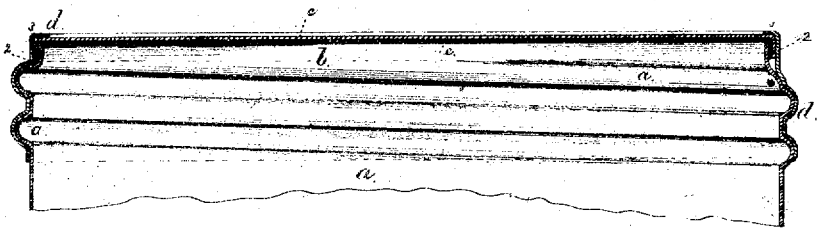
Figure 2:
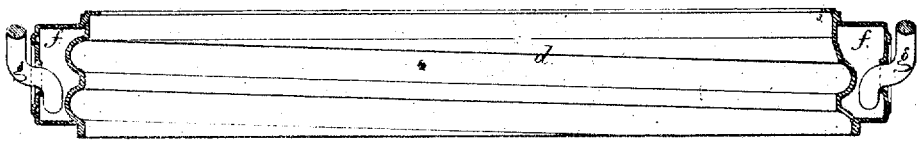
Figure 5:
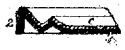
Figure 3:
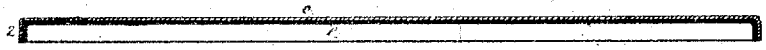
Figure 4:
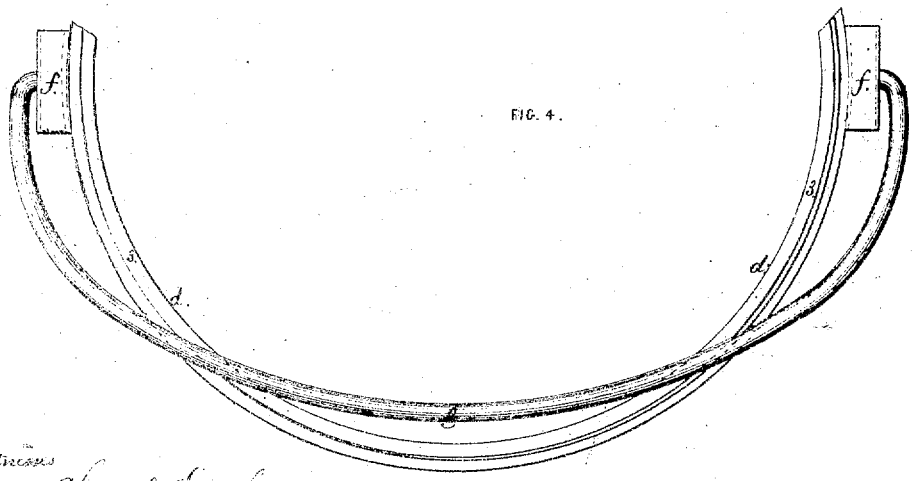

Figure 1 is a vertical section of the top of the pail, the screw-ring, and the cover. Fig. 2 shows the screw-ring separately in section. Fig. 3 is a section of the cover. Fig. 4 is a plan showing part of the screw-ring, ears, and bale; and Fig. 5 shows a portion of the cover of a different shape, sectionally, to that in Fig. 3.

Sheet-metal rings have been made to screw upon glass preserve-cans, and metallic covers with screw-flanges have been made to cover glass preserve-jars, and also as covers for oil-cans and other articles. These articles are not adapted to forming covers for paint-cans and pails, because the adhesive character of the paint is likely to prevent the cover turning if the same were made with the screw-flange, and a packing introduced between the cover, and the edge of the sheet-metal rim is liable to be cut and displaced by revolving the cover. My invention is designed to remove these objections, to make use of a sheet-metal ring with an inward flange and screw, combined with a screw-rim on the edge of the pail or can, and an inward set-off, upon which the cover and packing rest, so that the screw-ring can be dropped over the edges of the cover and screwed upon the rim of the pail or can to press the cover to its place; and upon the screw-ring are metallic ears receiving the ends of the bail, which bail thereby becomes a wrench for revolving the screw-ring.

In the drawing, *a* is the top rim of the pail, box, or can, formed with a screw-thread around it, and with an inward set-off at *b*, upon the top of which rests the cover *c*, with a flange, 2, coming around the outside of the set-off *b*; but said cover and flange are of less diameter than the screw *a*, so that the ring *d* can drop over the said cover *c* and be screwed upon *a*, the flange 3 of the ring *d* binding the cover *c* between itself and the set-off *b*. The packing *e* of a sheet of paper or other material introduced between the cover *c* and the set-off or rim *b* serves to make the can or pail air-tight or nearly so; and the cover may have simply a flange, as at 2, Fig. 3, or it may be stamped up by dies with ribs and grooves concentrically, as in section, Fig. 5. The ring *d* may be used without a bail, and the pail, can, or box to which the rim *a* is attached, or upon which the screw and set-off are formed, may be of any desired size or shape. The ears *f* are attached at their ends to the ring *d*, so as to form a loop, and the ends of the bail *g* pass into said ears, as illustrated in Figs. 2 and 4.

It will now be understood that the bail *g* can be used as a wrench in screwing the ring *d* to place or in removing the same, and the ring *d* can be screwed again upon the rim of the pail or can after the cover *c* has been removed, so that the bail serves for handling said pail or can and the can can thus be used as a paint-pot.

I claim as my invention—

1. The sheet-metal can, made with a screw at the upper portion of the sides, and an inward offset for the flanged sheet-metal cover, in combination with the screw-ring *d*, substantially as set forth, so that the cover or its packing rests upon the edge of the sheet-metal can, and the flange of the cover intervenes between the offset and the screw-ring, as set forth.

2. The ears *f* and bail *g*, in combination with the sheet-metal screw-ring *d*, as and for the purposes set forth.

3. The combination of the sheet-metal screw-ring *d*, ears *f*, and bail *g*, with the rim *a*, inward offset *b*, and cover *c*, as set forth.

Signed by me this 23d day of August, 1871.

JOHN K. CHACE.

Witnesses:

HAROLD SERRELL,
GEO. T. PINCKNEY.

(136)